A. MAYER.
Gas Cooking Stove.
No. 12,741. Patented April 17, 1855.
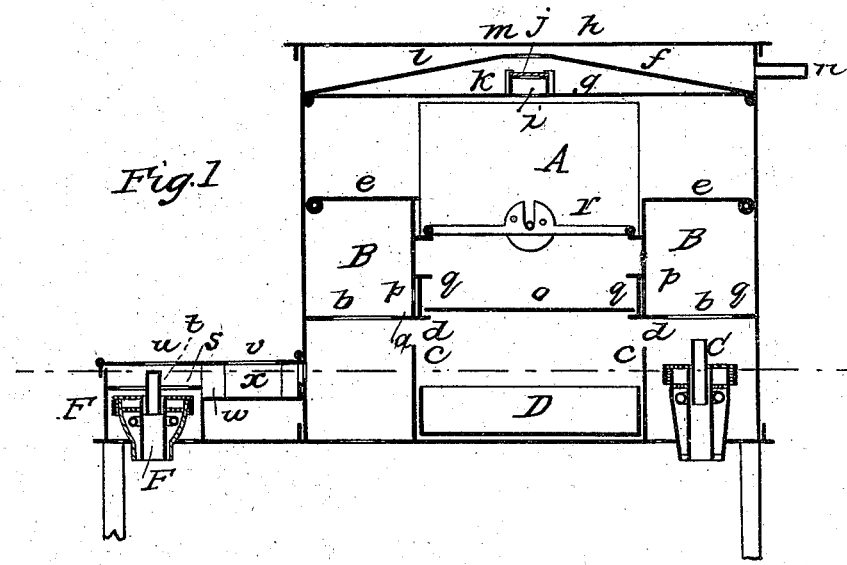
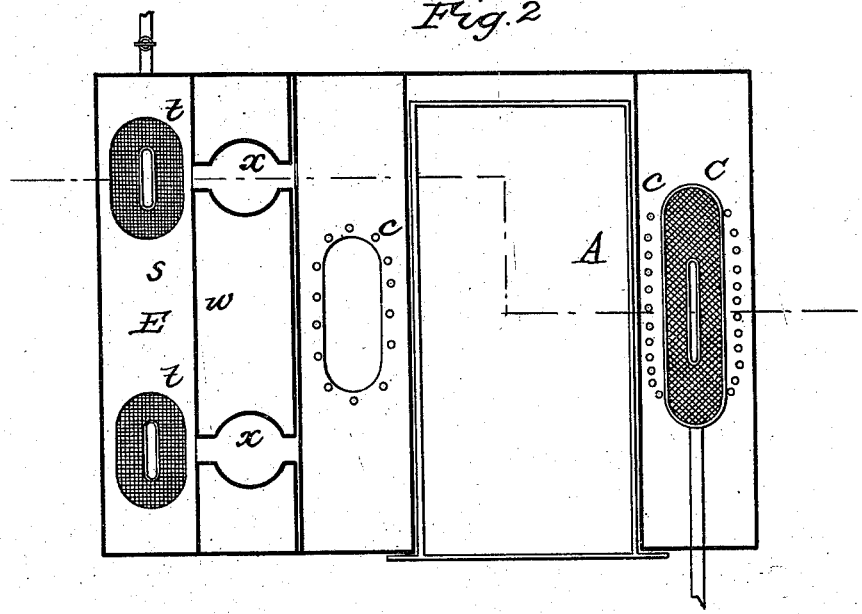

UNITED STATES PATENT OFFICE.

ANDREW MAYER, OF PHILADELPHIA, PENNSYLVANIA.

GAS COOKING-STOVE.

Specification of Letters Patent No. 12,741, dated April 17, 1855.

*To all whom it may concern:*

Be it known that I, ANDREW MAYER, of the city and county of Philadelphia and State of Pennsylvania, have invented a new and useful Improvement in Gas-Stoves for Cooking Purposes; and I do hereby declare that the following is a full, clear, and exact description of the same, reference being had to the accompanying drawings, forming part of this specification, in which—

Figure 1, is a vertical section of a stove constructed according to my invention. Fig. 2, is a horizontal section of the same.

The direction of each section is indicated in the other figure by a dotted line.

Similar letters of reference indicate corresponding parts in the several figures.

This invention consists in certain improvements in the construction and arrangement of the several parts of a gas cooking stove for the purposes of roasting or baking as may be desired, and for the purpose of conducting the heat without waste, under pots, kettles, pans, &c., for boiling, frying, broiling or such processes as are usually performed in vessels or utensils placed over openings in the stove.

To enable those skilled in the art to make and use my invention I will proceed to describe its construction and operation.

A, represents the oven or roasting apartment of the stove extending from end to end of the stove.

B, B, are two chambers one on either side of the oven which I denominate the "hot air chambers." The covers $e, e$, of these chambers are hinged so as to be capable of opening the chambers at the top. At a short distance below the bottom $a, a$, of each of these chambers, I place one or more burners C, which need not be described here further than to say that they may be constructed like the burners now in common use, but that I propose to use in preference a burner of my own invention. The bottoms of the chambers have each an opening $b$, of about the same size and form as the fire bed of the burner, standing directly over the burner. The spaces around the burners are separated from the oven or roasting apartment by partitions $c, c$, which extend nearly up to the bottom of the hot air chambers leaving only narrow openings $d, d$, the whole length of the stove. The roof of the oven or roasting chamber consists of three plates $f, g, h$, the lower $g$, of which has a passage $i$, above it communicating with the oven by openings at proper intervals or only near its ends, and with the space $k$, above by an opening fitted with a damper $j$. The space $k$, communicates with the space $l$, above by means of an opening $m$, and the space $l$, is in direct communication with the chimney $n$, which needs to consist only of a very small pipe.

In baking bread and other articles a plate $o$, of the whole length and width of the oven is placed upon suitable resting places. This plate then forms the bottom of the oven. The air heated by passing around and through the burner will then enter the hot air chamber B, B, the covers of which may be opened to any desired degree to allow of its escape. The oven will be heated by radiation from the bottom and sides, and also from the roof and by the heated air escaping into the other part. The heated air may also be admitted through openings $p, p$, in the sides of the oven by moving slides $q, q$. To roast meat, poultry, &c., I take away the plate $o$, and hang the meat on a spit $r$. The covers of the hot air chambers B, B, may then be closed entirely and the heated air allowed to pass entirely through $d, d$, or partly through the openings $p, p$, or the covers may be partly opened according as it is desired to expose the bottom sides or top to the greatest heat. The spit may be turned when desired, and the meat be basted with the fat and gravy in the dripping pan D, at the bottom.

E, is the pot stand in the bottom of which may be fitted one or more burners F, which may be of the common or of my improved kind. Above these burners and a short distance below the top plate is a plate $s$, of a similar characters to the bottom plates $a, a$, of the hot air chambers B, B, having holes $t, t$, corresponding in form with the burners. By thus covering the spaces around the burners with the plates $a, a$, and $s$, and leaving only openings $b, b$, and $t, t$, of the size of the burners and sufficient space for the air to pass from around the burner over the flame and through the said openings the air is caused to pass in immediate contact with the flame, and when heated is prevented being distributed laterally where it is not required and thereby wasted. The stand E, contains two sets of pot holes, one $u$, directly over the burners and one $v$, behind them.

In order to conduct the heated air under the back set of pot holes without waste I divide the interior of the pot stand into two parts, by a partition $w$, and provide passages $x$, $x$, see Fig. 2, under the back set of pot holes of a form nearly corresponding with the said holes to conduct the heated air escaping from beneath the front set of holes under the back set without allowing it to fill the space $y$, in the back part of the pot stand, and thereby I save much heat. The air escaping from under the back row of pot holes assists in heating the oven.

I do not claim as new in stoves, separately considered, the several parts or devices specified: but What I do claim as new and useful for cooking by gas and desire to secure by Letters Patent is—

The arrangement herein shown and described of the gas lamps or burners with their overhanging perforated plates or openings, side apertures or passages for distribution of the heat, oven, and hot air chambers or boxes situated at the sides of the oven within the body of the stove and provided with lids and side valves as set forth and for the purposes specificed.

ANDREW MAYER.

Witnesses:
STEPHEN R. SIMMONS,
WILLIAM DELANY.